(12) United States Patent
Xu et al.

(10) Patent No.: US 11,863,653 B2
(45) Date of Patent: Jan. 2, 2024

(54) PROTOCOL PROCESSING METHOD AND STORAGE MEDIUM

(71) Applicant: ZTE CORPORATION, Guangdong (CN)

(72) Inventors: Benchong Xu, Guangdong (CN); Fang Hu, Guangdong (CN); Huilai Wang, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 0 days.

(21) Appl. No.: 17/427,636

(22) PCT Filed: Jan. 21, 2020

(86) PCT No.: PCT/CN2020/073371
§ 371 (c)(1),
(2) Date: Jul. 31, 2021

(87) PCT Pub. No.: WO2020/156353
PCT Pub. Date: Aug. 6, 2020

(65) Prior Publication Data
US 2022/0103660 A1    Mar. 31, 2022

(30) Foreign Application Priority Data
Feb. 2, 2019    (CN) .......................... 201910107348.3

(51) Int. Cl.
G06F 15/173    (2006.01)
H04L 69/24    (2022.01)
(Continued)

(52) U.S. Cl.
CPC .............. *H04L 69/24* (2013.01); *H04L 45/24* (2013.01); *H04L 69/03* (2013.01); *H04L 69/26* (2013.01)

(58) Field of Classification Search
None
See application file for complete search history.

(56) References Cited

U.S. PATENT DOCUMENTS 10,848,416 B2    11/2020    Przygienda et al.
2012/0039161 A1*    2/2012    Allan ................... H04L 47/125
370/216
(Continued)

FOREIGN PATENT DOCUMENTS

CN    102164081 A    8/2011
CN    103907322 A    7/2014
(Continued)

OTHER PUBLICATIONS

T. Przygienda et al., Ed., RIFT: Routing in Fat Trees (draft-przygienda-rift-05), Apr. 10, 2018, Juniper Networks, pp. 1-23. (Year: 2018).*
(Continued)

Primary Examiner — Phyllis A Book
(74) Attorney, Agent, or Firm — Li & Cai Intellectual Property (USA) Office (57) ABSTRACT

A protocol processing method and apparatus, and a storage medium are provided. The method includes: carrying a leaf-transfer capability identifier in an RIFT protocol, the leaf-transfer capability identifier being configured to indicate that a first node that carries the leaf-transfer capability identifier supports other leaf nodes within a network to access the network through the first node.

9 Claims, 3 Drawing Sheets

(51) Int. Cl.
*H04L 45/24* (2022.01)
*H04L 69/00* (2022.01)

(56) References Cited

U.S. PATENT DOCUMENTS

| | | | | |
|---|---|---|---|---|
| 2014/0044013 | A1* | 2/2014 | Punati | H04L 45/025 |
| | | | | 370/254 |
| 2016/0301565 | A1* | 10/2016 | Zahid | H04L 45/24 |
| 2017/0324826 | A1* | 11/2017 | Johnsen | H04L 45/24 |
| 2018/0041396 | A1* | 2/2018 | Li | H04L 41/122 |
| 2018/0183706 | A1* | 6/2018 | Przygienda | H04L 45/025 |
| 2019/0356583 | A1* | 11/2019 | Thubert | H04L 45/48 |
| 2019/0363975 | A1* | 11/2019 | Djernaes | H04L 49/1515 |
| 2019/0394701 | A1* | 12/2019 | Nainar | H04W 40/26 |

FOREIGN PATENT DOCUMENTS

| | | | |
|---|---|---|---|
| CN | 104246700 A | 12/2014 | |
| CN | 105324964 A | 2/2016 | |
| CN | 107113233 A | 8/2017 | |
| CN | 107533486 A | 1/2018 | |
| CN | 108243103 A | 7/2018 | |
| CN | 109672550 A | 4/2019 | |
| WO | WO-2016133831 A2 * | 8/2016 | ............ H04L 45/02 |

OTHER PUBLICATIONS

WIPO, International Search Report dated Mar. 11, 2020.
T. Przygienda et al. "RIFT: Routing in Fat Trees," draft-przygienda-rift-05 issued on Apr. 10, 2018.
The RIFT Authors, "RIFT: Routing in Fat Tress draft-ietf-rift-rift-03", RIFT Working Group, issued on Oct. 19, 2018.
China Patent Office, CN201910107348.3 First Office Action dated Apr. 25, 2022.
The RIFT Authors, "RIFT: Routing in Fat Tress draft-ietf-rift-rift-03", RIFT Working Group, Internet-Draft, Oct. 19, 2018.
China Patent Office, CN201910107348.3 Second Office Action dated Nov. 14, 2022.

* cited by examiner

FIG. 1

Carry a leaf-transfer capability identifier in an RIFT protocol, the leaf-transfer capability identifier being configured to indicate that a first node that carries the leaf-transfer capability identifier supports other leaf nodes within a network to access the network through the first node ⌒S202

PROTOCOL PROCESSING METHOD AND STORAGE MEDIUM

CROSS-REFERENCE TO RELATED APPLICATION

The present application claims priority from the Chinese patent application No. 201910107348.3 filed with the China Patent Office on Feb. 2, 2019, the entire contents of which are incorporated in the present application by reference.

TECHNICAL FIELD

The present application relates to the field of communications, and in particular, relates to a protocol processing method and apparatus, and a storage medium.

BACKGROUND

Figure 1:
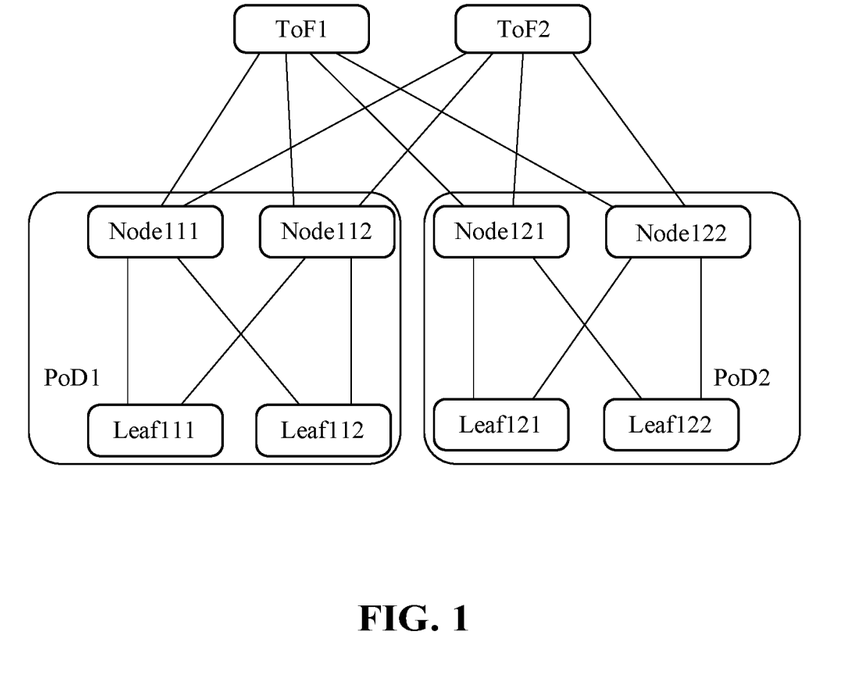
FIG. 1 is a schematic diagram of a basic topology of RIFT in the related art.

Currently, the routing in fat tree (RIFT) technology, a routing protocol designed for fat tree topology (as shown in FIG. 1), is emerging and has been widely used in data center networks, and may be used in the fields of metropolitan area networks, bearer networks, and the like. Compared with traditional routing protocols, the RIFT protocol has the following advantages: natural loop guard, supporting zero touch provisioning (ZTP) and convenient to deploy, supporting network self-inspection, greatly reduced routing table number of underlying equipment, supporting high-degree of equal-cost multipath routing (ECMP), and the like. These advantages have led to an increasing research effort on the RIFT protocol.

Currently, the RIFT protocol provides very good support for a spine-leaf type topology network, and has also considered a scenario in which leaf nodes are interconnected, but cannot support or adapt to a scenario of leaf ring network access. However, ring network access is very common in reality, especially in the scenarios such as a metropolitan area network, a bearer network, etc., in which the RIFT protocol cannot support access to a leaf ring network.

SUMMARY

Embodiments of the present disclosure provide a protocol processing method and apparatus, and a storage medium, which at least solve the problems that the RIFT protocol in the related art cannot support leaf ring network access and the like.

According to an embodiment of the disclosure, there is provided a protocol processing method, including: carrying a leaf-transfer capability identifier in a routing in fat tree (RIFT) protocol, the leaf-transfer capability identifier being configured to indicate that a first node that carries the leaf-transfer capability identifier supports other leaf nodes within a network to access the network through the first node.

In an implementation, the method further includes: establishing a neighbor relation between two different leaf nodes carrying a leaf-transfer capability, where, in response to that all the leaf nodes in a subnet of the network support the leaf-transfer capability, a current link, which is an east-west link, supports the leaf-transfer capability.

In an implementation, the method further includes: in response to that a second node in the network receives a link information element (LIE) message of a leaf level and enables the leaf-transfer capability, determining the second node to be the leaf node and enabling a leaf-transfer function by the second node.

In an implementation, determining the second node to be the leaf node and enabling the leaf-transfer function by the second node includes at least one of: determining the second node to be the leaf node through configuration information, and enabling the leaf-transfer function by the second node; and determining the second node to be the leaf node through a learning mode, and enabling the leaf-transfer function by the second node.

In an implementation, the method further includes: flooding, by the leaf node, node topology information element (Node TIE) information on the link supporting the leaf-transfer capability so that a neighbor node of the leaf node learns topology status information of the leaf node.

In an implementation, the method further includes: flooding, by the leaf node, local prefix information of the leaf node on the link supporting the leaf-transfer capability via a prefix topology information element (Prefix TIE).

In an implementation, the method further includes: flooding, by the leaf node with a northbound neighbor node, a prefix learned from a prefix southbound topology information element (Prefix S-TIE) of the neighbor node of the leaf node on the link supporting the leaf-transfer capability via the Prefix TIE.

In an implementation, the method further includes: after receiving the Prefix TIE, executing, by the leaf node, routing computation of routing in fat tree shortest path first (RIFT SPF), where a topology in the routing computation needs to contain the link supporting the leaf-transfer capability.

In an implementation, the method further includes: selecting, by the leaf node with the northbound neighbor node for a route with a same prefix, in response to that the route contains an egress interface and a next hop pointing to the northbound neighbor as well as an egress interface and a next hop pointing to an east-west neighbor, the egress interface and the next hop pointing to the northbound neighbor.

According to another embodiment of the disclosure, there is further provided a protocol processing apparatus, including: a processing module configured to carry a leaf-transfer capability identifier in an RIFT protocol, the leaf-transfer capability identifier being configured to indicate that a first node that carries the leaf-transfer capability identifier supports other leaf nodes within a network to access the network through the first node.

According to another embodiment of the disclosure, there is further provided a storage medium having a computer program stored thereon, the computer program, when being executed, causes the above protocol processing method to be implemented.

In the present application, the leaf-transfer capability identifier is carried in the RIFT protocol, and the leaf-transfer capability identifier is configured to indicate that the first node that carries the leaf-transfer capability identifier supports other leaf nodes within the network to access the network through the first node. By adopting the above technical solution, the problems that the RIFT protocol in the related art cannot support leaf ring network access and the like are solved, and thus leaf ring network access is realized through the RIFT protocol.

DETAILED DESCRIPTION

The present application will be described in detail below with reference to the accompanying drawings in conjunction with embodiments. It should be noted that embodiments of the present application and features therein may be combined with each other in any manner, as long as they are not contradictory.

It should be also noted that terms "first", "second", and the like in the description, claims and drawings of the present application are used for the purpose of distinguishing similar objects instead of indicating a specific order or sequence.

Figure 2:
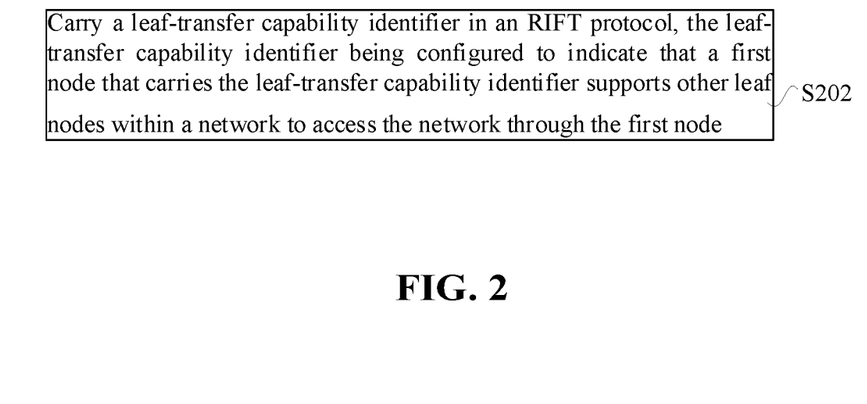
FIG. 2 is a flowchart of a protocol processing method according to an embodiment of the present disclosure.

An embodiment of the present disclosure provides a protocol processing method. FIG. 2 is a flowchart of a protocol processing method according to an embodiment of the present disclosure. As shown in FIG. 2, the method includes the following step S202.

At step S202, a leaf-transfer capability identifier is carried in an RIFT protocol, the leaf-transfer capability identifier being configured to indicate that a first node that carries the leaf-transfer capability identifier supports other leaf nodes within a network to access the network through the first node.

According to the embodiment of the application, the leaf-transfer capability identifier is carried in the RIFT protocol, and the leaf-transfer capability identifier is configured to indicate that the first node that carries the leaf-transfer capability identifier supports other leaf nodes within the network accessing the network through the first node. By adopting the above technical solution, the problems that the RIFT protocol in the related art cannot support leaf ring network access and the like are solved, and a solution of realizing leaf ring network access through the RIFT protocol is provided.

In an implementation of the disclosure, the method may further include: establishing a neighbor relation between two different leaf nodes carrying a leaf-transfer capability, wherein in response to that all the leaf nodes in a subnet of the network support the leaf-transfer capability, a current link, which is an east-west link, supports the leaf-transfer capability.

In an implementation of the disclosure, the method may further include: supporting ZTP by the RIFT protocol, and in response to that a second node in the network receives only an LIE message of a leaf level and the second node enables the leaf-transfer capability, defaulting the second node to be the leaf node and enabling the leaf-transfer function by the second node.

In an implementation of the present disclosure, defaulting the second node to be the leaf node and enabling the leaf-transfer function by the second node includes at least one of: determining the second node to be the leaf node through configuration information, and enabling the leaf-transfer function by the second node; and determining the second node to be the leaf node in a learning mode, and enabling the leaf-transfer function by the second node. In an implementation, a behavior of defaulting itself enabling the leaf-transfer capability may be implemented by the node when determining the node to be the leaf node through configuration or learning; and the above behavior of defaulting itself to be leaf and enabling the leaf-transfer capability may be implemented by modifying configuration.

In an implementation of the disclosure, the method may further include: flooding, by the leaf node, Node TIE information on the link supporting the leaf-transfer capability, so that a neighbor node of the leaf node learns topology status information of the leaf node.

In an implementation of the disclosure, the method may further include: flooding, by the leaf node, local prefix information of the leaf node on the link supporting the leaf-transfer capability via a Prefix TIE. The local prefix information in the embodiment of the disclosure mainly refers to local direct routing, address routing and routing imported by other protocols, but does not include routing prefixes learned through an upper S-TIE.

In an implementation of the disclosure, the method may further include: flooding, by the leaf node with a northbound neighbor node, a prefix learned from a Prefix S-TIE of the neighbor node of the leaf node on the link supporting the leaf-transfer capability via the Prefix TIE.

In an implementation of the disclosure, the method may further include: after receiving the Prefix TIE, executing, by the leaf node, routing computation of RIFT SPF, where a topology in the routing computation needs to contain the link supporting the leaf-transfer capability.

In an implementation of the disclosure, the method may further include: selecting, by the leaf node with the northbound neighbor node for a route with a same prefix, in response to that the route contains an egress interface and a next hop pointing to the northbound neighbor as well as an egress interface and a next hop pointing to an east-west neighbor, the egress interface and the next hop pointing to the northbound neighbor.

Through the description of the above implementations, those skilled in the art can clearly understand that the method according to the above embodiment may be implemented by means of software plus a necessary general hardware platform. Obviously, it may also be implemented by hardware, but in most cases, the former is preferable. Based on such understanding, the technical solutions of the present application or portions contributing to the related art may be embodied in the form of a software product, where the computer software product is stored in a storage medium (such as a read only memory (ROM)/random access memory (RAM), a magnetic disk, and an optical disk), and includes several instructions for enabling a terminal device (which may be a mobile phone, a computer, a server, or a network device, etc.) to execute the method in the embodiment of the present application.

An embodiment of the present disclosure further provides a protocol processing apparatus configured to implement the above embodiment and the implementations. Details which have been explained will not be repeated here. As used herein, the term "module" may be a combination of software and/or hardware that can realize a preset function. Although the apparatus described in the following embodiment is preferably implemented in software, an implementation of hardware, or a combination of software and hardware, is also possible and contemplated.

Figure 3:
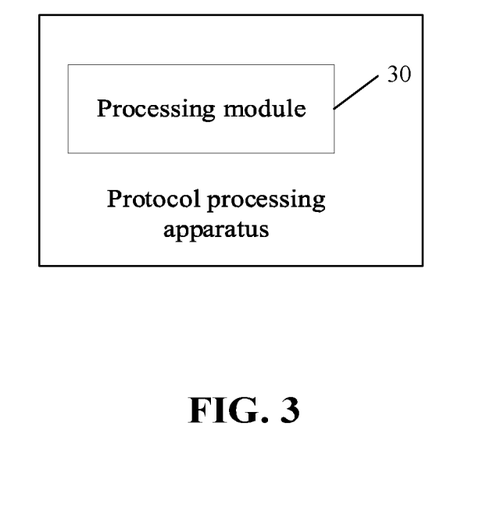
FIG. 3 is a block diagram of a protocol processing apparatus according to an embodiment of the present disclosure.

FIG. 3 is a block diagram of a protocol processing apparatus according to an embodiment of the present disclosure. As shown in FIG. 3, the apparatus includes a processing module 30.

The processing module 30 is configured to carry a leaf-transfer capability identifier in an RIFT protocol, the leaf-transfer capability identifier being configured to indicate that a first node that carries the leaf-transfer capability identifier supports other leaf nodes within a network to access the network through the first node.

In the present application, the leaf-transfer capability identifier is carried in the RIFT protocol, and the leaf-transfer capability identifier is configured to indicate that the first node that carries the leaf-transfer capability identifier supports other leaf nodes within the network to access the network through the first node. By adopting the above technical solution, the problems that the RIFT protocol in the related art cannot support leaf ring network access and the like are solved, and thus leaf ring network access is realized through the RIFT protocol.

In an implementation of the present disclosure, a neighbor relation is established between two different leaf nodes carrying a leaf-transfer capability. If all the leaf nodes in a subnet of the network support the leaf-transfer capability, a current link, which is an east-west link, supports the leaf-transfer capability.

In an implementation of the present disclosure, the RIFT protocol supports ZTP, if a second node in the network receives an LIE message of a leaf level and enables the leaf-transfer capability, the second node is defaulted to be the leaf node and enables the leaf-transfer function. In an implementation, the behavior of defaulting itself enabling the leaf-transfer capability may be implemented by the node when determining the node to be the leaf node through configuration or learning; and the above behavior of defaulting itself to be leaf and enabling the leaf-transfer capability may be implemented by modifying configuration.

In an implementation of the present disclosure, the leaf node floods Node TIE information on the link supporting the leaf-transfer capability, so that a neighbor node of the leaf node learns topology status information of the leaf node.

In an implementation of the present disclosure, the leaf node floods local prefix information of the leaf node on the link supporting the leaf-transfer capability via a Prefix TIE, where the local prefix information in the embodiment of the disclosure mainly refers to local direct routing, address routing and routing imported by other protocols, but does not include routing prefixes learned through an upper S-TIE.

In an implementation of the present disclosure, the leaf node with a northbound neighbor node floods a prefix learned from a Prefix S-TIE of the neighbor node of the leaf node on the link supporting the leaf-transfer capability via the Prefix TIE.

In an implementation of the present disclosure, the leaf node executes, after receiving the Prefix TIE, routing computation of RIFT SPF, where a topology in the routing computation needs to contain the link supporting the leaf-transfer capability.

In an implementation of the present disclosure, the leaf node with the northbound neighbor node selects for a route with a same prefix, in response to that the route contains an egress interface and a next hop pointing to the northbound neighbor as well as an egress interface and a next hop pointing to an east-west neighbor, the egress interface and the next hop pointing to the northbound neighbor.

In summary, embodiments of the present disclosure actually provide a method and an apparatus for supporting ring network access via a RIFT protocol, where the leaf-transfer capability identifier is added to the RIFT protocol, and the leaf node carrying such identifier represents supporting other leaf nodes to access a network through this leaf node, which is commonly represented by supporting leaf node ring network access. An east-west neighbor with the leaf-transfer capability needs to flood the Prefix TIE learned by the node; and north-south routing computation requires a topology including the east-west neighbor with the leaf-transfer capability.

The embodiment of the disclosure includes the following technical solution: adding the leaf-transfer capability identifier to the RIFT protocol, and the leaf node carrying such identifier to represent supporting other leaf nodes to access a network through this leaf node. This capability identifier is carried in LIE and NODE TIE messages.

For enumeration types of the capability identifier, solutions in the related art may be adopted, while this embodiment of the present disclosure focuses on adding the leaf_transfer capability identifier, for example:

```
enum HierarchyIndications {
    leaf_only                              = 0,
    leaf_only_and_leaf_2_leaf_procedures   = 1,
    top_of_fabric                          = 2,
    leaf_transfer                          = 3, representing that this
node transfers messages to other nodes;
}
```

It should be noted that, the limitation of leaf_transfer=3 in this embodiment of the disclosure is merely used as an implementation of the embodiment, and any other reasonable value may be used according to the actual situation. It may be appointed that what value of the leaf_transfer represents the first node that carries the leaf-transfer capability identifier supports other leaf nodes within the network to access the network through the first node.

In an implementation, when two leaf nodes have different leaf-transfer capabilities, a neighbor relation may be established therebetween. However, only when all the leaf nodes in a subnet support the leaf-transfer capability, it represents that the link supports leaf-transfer and is an east-west link.

In an implementation, the RIFT supports ZTP, and if a node receives only an LIE message of a leaf level and enables the leaf-transfer capability, the node defaults itself to be a leaf and enables the leaf-transfer function. This behavior may be changed through local configuration.

In an implementation, the leaf node floods Node TIE on the link supporting the leaf-transfer capability, so that a neighbor can learn link status information of the leaf node. The Node TIE may be north-bound TIE (N-TIE), or may be Node S-TIE, which is not limited here.

In an implementation, the leaf node floods local prefix information thereof on the link supporting the leaf-transfer capability via a Prefix TIE. The Prefix TIE may be Prefix N-TIE, which is not limited here.

In an implementation, the leaf node with a northbound neighbor node floods a prefix (including a default prefix) learned from Prefix S-TIE of the neighbor on the link supporting the leaf-transfer capability via the Prefix TIE. The Prefix TIE may be Prefix S-TIE, in which case the cost metric (which may also be understood as cost) of the corresponding link would be increased hop-by-hop; or the Prefix TIE may be Prefix N-TIE, which is not limited.

In an implementation, after receiving the Prefix TIE, the leaf node executes the corresponding routing computation of RIFT SPF, where a topology in the routing computation needs to contain the link supporting the leaf-transfer capability. In general, after the Prefix N-TIE is received, an RIFT Southbound SPF (S-SPF) algorithm is used for path computation; and for Prefix S-TIE, an RIFT northbound SPF (N-SPF) algorithm is used for path computation.

In an implementation, if the leaf node has a northbound neighbor, and a route with a same prefix contains an egress interface and a next hop pointing to the northbound neighbor as well as an egress interface and a next hop pointing to an east-west neighbor, the egress interface and the next hop pointing to the northbound neighbor should be selected.

In an implementation, the scenario supported by the embodiment of the disclosure is not limited to the scenario of ring network access, but may further include any other scenario in which the leaf node accesses the network via other leaf nodes.

It should be noted that the technical solutions of the foregoing embodiments may be used in combination or may be used alone, which is not limited in the embodiments of the present disclosure.

The following describes the above technical solutions with reference to optional embodiments, but the technical solutions of the embodiments of the present disclosure are not limited thereto.

In an optional embodiment I, Node N-TIE and Prefix N-TIE are used for delivering topologies and prefixes between leaf-transfer enabled neighbors. The routing computation is performed using an RIFT S-SPF algorithm.

A new capability, i.e., leaf-transfer capability, is added to the RIFT protocol, and carrying this identifier represents supporting other leaf nodes to access a network through this leaf node. Like leaf-to-leaf which has been defined by the protocol, this capability carries notices in node capability options of LIE and Node TIE messages.

When two leaf nodes have different leaf-transfer capabilities, a neighbor relation may be established therebetween. However, only when all the leaf nodes in a subnet support the leaf-transfer capability, it represents that the link supports leaf-transfer.

In consideration of ZTP, if a node receives only an LIE message of a leaf level and enables the leaf-transfer capability, the node defaults itself to be a leaf and enables the leaf-transfer function. This behavior may be changed through local configuration.

Figure 4:
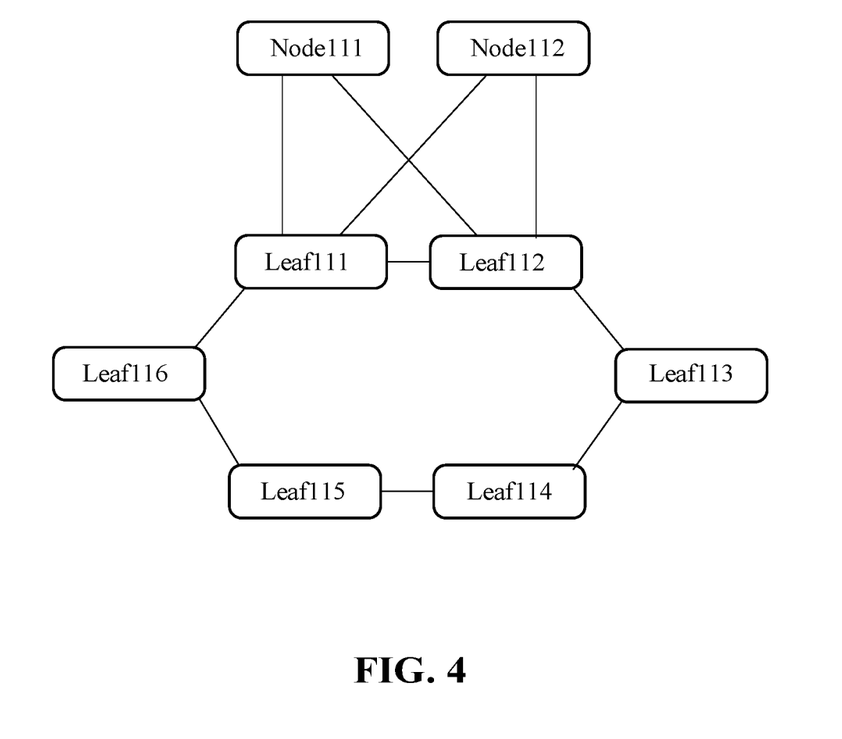
FIG. 4 is a schematic diagram of leaf node ring network access which is not connected to an upper node in RIFT according to an embodiment of the present disclosure.

As shown in FIG. 4, all the leaf nodes form a mesh network and advertise the leaf-transfer capability. For convenience of description, the following assumptions are made: a cost between leaves is 1; the Prefix S-TIE received by nodes Leaf111 and Leaf112 contains a default prefix of 0.0.0.0/0; Leaf111 has a local prefix 1.1.1.0/24, Leaf112 has a local prefix 2.1.1.0/24, and Leaf114 has a local prefix 4.1.1.0/24.

The leaf nodes generate and flood Node N-TIE on leaf-transfer links. For example, Leaf111 generates Node N-TIE and floods to Leaf112 and Leaf116 which, after receiving the Node N-TIE, continue to flood to leaf neighbors thereof. Eventually, all the leaf nodes learn the topology of leafs.

The local prefix of the leaf node generates the Prefix N-TIE and floods on the leaf-transfer link via the Prefix N-TIE. For example, the local prefix 1.1.1.0/24 of Leaf111 generates the Prefix N-TIE and floods to Leaf112 and Leaf116 via the Prefix N-TIE, and then Leaf112 and Leaf116 continue to flood to other leaf neighbors. Eventually, all leaf nodes learn the local prefix of the leaf.

The default prefix 0.0.0.0/0 learned from the northbound neighbor, after the metric is increased, is flooded on a leaf-transfer link via the Prefix N-TIE. For example, Leaf111 learns the default prefix from an upper node, generates the Prefix N-TIE containing 0.0.0.0/0, and floods to Leaf112 and Leaf116 which, after receiving the Node N-TIE, continue to flood to leaf neighbors thereof. Leaf112 will behave in a same way. Eventually, all leaf nodes learn the default prefix of Leaf111 and Leaf112.

All leaf nodes perform the routing computation using a RIFT S-SPF computation method, and the topology used in the routing computation includes a leaf-transfer function enabled link. In an implementation, on a node with a northbound neighbor, if the next hop of the default route points to the northbound neighbor, the default route cannot use the leaf-transfer link as an egress interface.

Finally, route on Leaf111:
0.0.0.0/0, the egress interface and the next hop pointing to Node111 and Node112;
2.1.1.0/24, the egress interface and the next hop pointing to Leaf112;
4.1.1.0/24, the egress interface and the next hop pointing to Leaf112 and Leaf116;
route on Leaf112:
0.0.0.0/0, the egress interface and the next hop pointing to Node111 and Node112;
1.1.1.0/24, the egress interface and the next hop pointing to Leaf111;
4.1.1.0/24, the egress interface and the next hop pointing to Leaf113;
route on Leaf113:
0.0.0.0/0, the egress interface and the next hop pointing to Leaf112;
1.1.1.0/24, the egress interface and the next hop pointing to Leaf112;
2.1.1.0/24, the egress interface and the next hop pointing to Leaf112;
4.1.1.0/24, the egress interface and the next hop pointing to Leaf114;
route on Leaf114:
0.0.0.0/0, the egress interface and the next hop pointing to Leaf113;
1.1.1.0/24, the egress interface and the next hop pointing to Leaf115 and Leaf113;
2.1.1.0/24, the egress interface and the next hop pointing to Leaf113;
route on Leaf115:
0.0.0.0/0, the egress interface and the next hop pointing to Leaf116;
1.1.1.0/24, the egress interface and the next hop pointing to Leaf116;
2.1.1.0/24, the egress interface and the next hop pointing to Leaf116 and Leaf114;
4.1.1.0/24, the egress interface and the next hop pointing to Leaf114;
route on Leaf116:
0.0.0.0/0, the egress interface and the next hop pointing to Leaf111;
1.1.1.0/24, the egress interface and the next hop pointing to Leaf111;
2.1.1.0/24, the egress interface and the next hop pointing to Leaf111; and
4.1.1.0/24, the egress interface and the next hop pointing to Leaf115.

Figure 5:
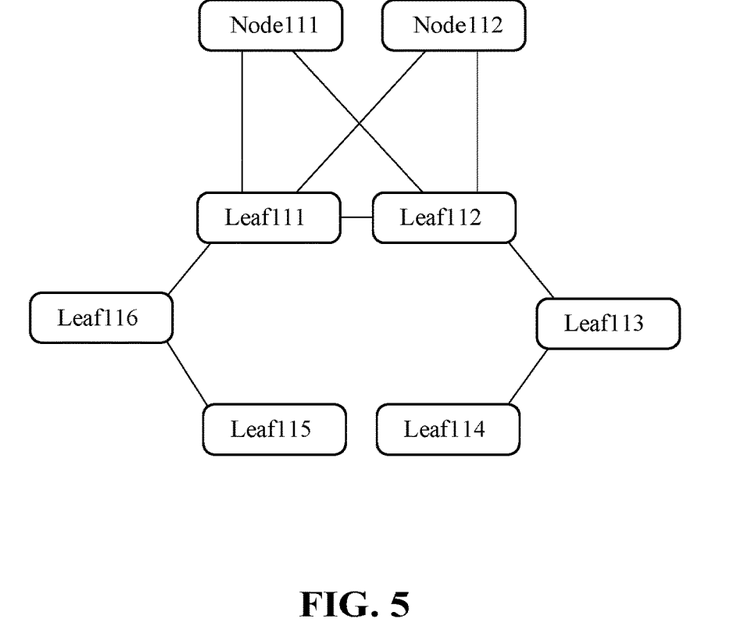
FIG. 5 is a schematic diagram of leaf node hop-by-hop access which is not connected to an upper node in RIFT according to an embodiment of the present disclosure.
Figure 6:
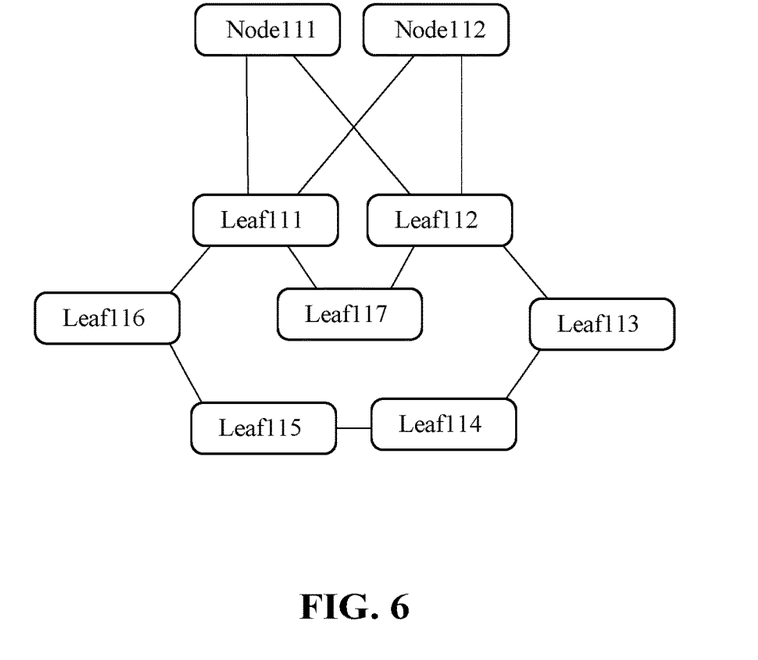
FIG. 6 is a schematic diagram of leaf node discontinuous access which is not connected to an upper node in RIFT according to an embodiment of the present disclosure.

For network variations, the link between Leaf114 and Leaf115 is disconnected, as shown in FIG. 5, or a node Leaf117 without any northbound neighbor is added between Leaf111 and Leaf112, as shown in FIG. 6, while the TIE flooding method and the routing computation method remain unchanged.

In an optional embodiment II, Node S-TIE is used for delivering topologies between leaf-transfer enabled neighbors, the Prefix N-TIE is used for delivering local prefixes, and Prefix S-TIE is used for delivering prefixes learned from an upper level. The routing computation is performed using an RIFT S-SPF algorithm.

Steps 1 to 4 are the same as those in optional embodiment I.

The leaf node generates and floods Node S-TIE on leaf-transfer links. For example, Leaf111 generates Node S-TIE and floods to Leaf112 and Leaf116 which, after receiving the Node N-TIE, continue to flood to leaf neighbors thereof. Eventually, all leaf nodes learn the topology of the leaf.

In this optional embodiment, Node N-TIE and Prefix N-TIE are used for delivering topologies and prefixes between leaf-transfer enabled neighbors. The routing computation is performed using an RIFT S-SPF algorithm.

A new capability, i.e., leaf-transfer capability, is added to the RIFT protocol, and carrying this identifier represents supporting other leaf nodes to access a network through this leaf node. Like leaf-to-leaf which has been defined by the protocol, this capability carries notices in node capability options of LIE and Node TIE messages.

When two leaf nodes have different leaf-transfer capabilities, a neighbor relation may be established therebetween. However, only when all the leaf nodes in a subnet support the leaf-transfer capability, it represents that the link supports leaf-transfer. In consideration of ZTP, if a node receives only an LIE message of a leaf level and enables the leaf-transfer capability, the node defaults itself to be a leaf and enables the leaf-transfer function. This behavior may be changed through local configuration.

The default prefix 0.0.0.0/0 learned from the northbound neighbor, floods on the leaf-transfer link via the Prefix S-TIE. For example, Leaf111 learns the default prefix from an upper node, generates Prefix S-TIE containing 0.0.0.0/0, and floods to Leaf112 and Leaf116 which, after receiving the Node N-TIE, continue to flood to leaf neighbors thereof. Leaf112 will behave in a same way. Eventually, all leaf nodes learn the default prefix of Leaf111 and Leaf112.

All leaf nodes perform the routing computation using a RIFT S-SPF computation method, and the topology used in the path computation includes a leaf-transfer function enabled link.

In an implementation, on a node with a northbound neighbor, if the next hop of the route corresponding to the prefix learned from Prefix S-TIE points to the northbound neighbor, the route correspond to this prefix cannot use the leaf-transfer link as an egress interface. For example, if the Prefix S-TIE received by Leaf111 and Leaf112 from Node111 contains Prefix 10.1.1.1/32, then both Leaf111 and Leaf112 have the route 10.1.1.1/32, and the egress interface and the next hop point to Node111. According to the previous steps, this prefix will be flooded to all leaf nodes by the Prefix S-TIE. Finally, the egress interface and the next hop of the route 10.1.1.1/32 on Leaf111 and Leaf112 remain unchanged. Other leafs select an egress interface and a next hop pointing to a neighbor according to the cost.

The computation results for other routes are the same as those in the optional embodiment I.

For network variations, the link between Leaf114 and Leaf115 is disconnected, as shown in FIG. 5, or a node Leaf117 without any northbound neighbor is added between Leaf111 and Leaf112, as shown in FIG. 6, while the TIE flooding method and the routing computation method remain unchanged.

In an optional embodiment III, Node S-TIE is used for delivering topologies between leaf-transfer enabled neighbors, Prefix N-TIE is used for delivering local prefixes, and Prefix S-TIE is used for delivering prefixes learned from an upper level. An RIFT S-SPF algorithm is used to compute a route for Prefix N-TIE prefix, and an RIFT N-SPF algorithm is used to compute a route for Prefix S-TIE prefix.

In this optional embodiment, Node N-TIE and Prefix N-TIE are used for delivering topologies and prefixes between leaf-transfer enabled neighbors. The routing computation is performed using an RIFT S-SPF algorithm.

A new capability, i.e., leaf-transfer capability, is added to the RIFT protocol, and carrying this identifier represents supporting other leaf nodes to access a network through this leaf node. Like leaf-to-leaf which has been defined by the protocol, this capability carries notices node capability options of LIE and Node TIE messages.

When two leaf nodes have different leaf-transfer capabilities, a neighbor relation may be established therebetween. However, only when all the leaf nodes in a subnet support the leaf-transfer capability, it represents that the link supports leaf-transfer.

In consideration of ZTP, if a node receives only an LIE message of a leaf level and enables the leaf-transfer capability, the node defaults itself to be a leaf and enables the leaf-transfer function. This behavior may be changed through local configuration.

The leaf node generates and floods Node S-TIE on leaf-transfer links. For example, Leaf111 generates Node S-TIE and floods to Leaf112 and Leaf116 which, after receiving the Node N-TIE, continue to flood to leaf neighbors thereof. Eventually, all leaf nodes learn the topology of the leaf.

The local prefix of the leaf node generates the Prefix N-TIE and floods on the leaf-transfer link via the Prefix N-TIE. For example, the local prefix 1.1.1.0/24 of Leaf111 generates the Prefix N-TIE and floods to Leaf112 and Leaf116 via the Prefix N-TIE, and then Leaf112 and Leaf116 continue to flood to other leaf neighbors. Eventually, all leaf nodes learn the local prefix of the leaf.

For the prefix learned via the Prefix N-TIE, path computation is performed using an RIFT S-SPF computation method, and the topology used in the path computation includes a leaf-transfer function enabled link.

The default prefix 0.0.0.0/0 learned from the northbound neighbor, floods on the leaf-transfer link via the Prefix S-TIE, the metric of the device prefix will increase after each hop, and a split horizon of a distance vector protocol or a poison reverse mechanism is required to be supported to prevent loops. For example, Leaf111 learns the default prefix from an upper node, generates Prefix S-TIE containing 0.0.0.0/0, and floods to Leaf112 and Leaf116, and during the flooding process, the metric is increased hop-by-hop. After receiving the message, Leaf112 finds that it has a better prefix, and thus discards the message. After receiving the message, Leaf116 only continues to flood to Leaf115 after the metric is increased, or sends a prefix with a maximum metric to Leaf111 while flooding to Leaf115. Other nodes behave in a similar manner.

An RIFT N-SPF computation method is used to compute a route for Prefix S-TIE prefix.

The computation result is the same as that in optional embodiment I.

In an embodiment of the present disclosure, there is further provided a storage medium including a program stored thereon which, when executed, causes the method of any one of the above embodiments to be implemented.

In this embodiment, the storage medium may be configured to store program codes for performing the following step:

S1, carrying a leaf-transfer capability identifier in an RIFT protocol, the leaf-transfer capability identifier being configured to indicate that a first node that carries the leaf-transfer capability identifier supports other leaf nodes within a network to access the network through the first node.

In this embodiment, the storage medium may include, but is not limited to: a U Disk, a read only memory (ROM), an RAM, a removable hard disk, a magnetic or optical disk, and other media that can store program codes.

Specific examples in the present embodiment may refer to the examples described in the foregoing embodiments and alternative implementations, which will not be repeated in the present embodiment.

Obviously, a person skilled in the art would understand that the above modules and steps of the present application can be realized by using a universal computing device, can be integrated in a single computing device or distributed on a network that consists of a plurality of computing devices; and in an implementation, they can be realized by using the executable program codes of the computing device, so that they can be stored in a storage device and executed by the computing device, in some cases, can perform the shown or described steps in a sequence other than herein, or they are made into various integrated circuit modules respectively, or a plurality of modules or steps thereof are made into a single integrated circuit module, thus to be realized. Thus, the present application is not limited to any specific combination of hardware and software.

What is claimed is:

1. A protocol processing method, comprising:
    carrying a leaf-transfer capability identifier in a routing in fat tree (RIFT) protocol, wherein the leaf-transfer capability identifier is configured to indicate that, a first node, that is a leaf node carrying the leaf-transfer capability identifier, supports other leaf nodes within a network to access the network through the first node, and transfers messages to other nodes;
    establishing a neighbor relation between two leaf nodes carrying the leaf-transfer capability, wherein in response to all the leaf nodes in a subnet of the network supporting the leaf-transfer capability, a current link, which is an east-west link, supports the leaf-transfer capability;
    flooding, by the leaf node, local prefix information of the leaf node on the link supporting the leaf-transfer capability via a prefix topology information element (Prefix TIE); and
    after receiving the Prefix TIE, executing, by the leaf node, routing computation of routing in fat tree shortest path first (RIFT SPF), wherein a topology in the routing computation needs to contain the link supporting the leaf-transfer capability.

2. The method according to claim 1, further comprising:
    in response to a second node in the network receiving only a link information element (LIE) message of a leaf level and enabling the leaf-transfer capability, thereby determining the second node to be a leaf node and enabling a leaf-transfer function by the second node.

3. The method according to claim 2, wherein determining the second node to be the leaf node and enabling the leaf-transfer function by the second node comprises at least one of:
    determining the second node to be the leaf node through configuration information, and enabling the leaf-transfer function by the second node; and
    determining the second node to be the leaf node in a learning mode, and enabling the leaf-transfer function by the second node.

4. The method according to claim 1, further comprising:
    flooding, by the leaf node, node topology information element (Node TIE) information on the link supporting the leaf-transfer capability, so that a neighbor node of the leaf node learns topology status information of the leaf node.

5. The method according to claim 1, further comprising:
    flooding, by the leaf node with a northbound neighbor node, a prefix learned from a prefix southbound topology information element (Prefix S-TIE) of the neighbor node of the leaf node on the link supporting the leaf-transfer capability via a Prefix TIE.

6. The method according to claim 5, further comprising:
    selecting, by the leaf node with the northbound neighbor node for a route with a same prefix, in response to that the route contains an egress interface and a next hop pointing to the northbound neighbor as well as an egress interface and a next hop pointing to an east-west neighbor, the egress interface and the next hop pointing to the northbound neighbor.

7. A non-transitory storage medium storing a computer program thereon, wherein the computer program, when executed by a processor, causes the method of claim 1 to be implemented.

8. A protocol processing method, comprising:
    carrying a leaf-transfer capability identifier in a routing in fat tree (RIFT) protocol, wherein the leaf-transfer capability identifier is configured to indicate that, a first node, that is a leaf node carrying the leaf-transfer capability identifier, supports other leaf nodes within a network to access the network through the first node, and transfers messages to other nodes;
    establishing a neighbor relation between two leaf nodes carrying the leaf-transfer capability, wherein in response to all the leaf nodes in a subnet of the network supporting the leaf-transfer capability, a current link, which is an east-west link, supports the leaf-transfer capability;
    flooding, by the leaf node with a northbound neighbor node, a prefix learned from a prefix southbound topology information element (Prefix S-TIE) of the neighbor node of the leaf node on the link supporting the leaf-transfer capability via a Prefix TIE; and
    selecting, by the leaf node with the northbound neighbor node for a route with a same prefix, in response to that the route contains an egress interface and a next hop pointing to the northbound neighbor as well as an egress interface and a next hop pointing to an east-west neighbor, the egress interface and the next hop pointing to the northbound neighbor.

9. A non-transitory storage medium storing a computer program thereon, wherein the computer program, when executed by a processor, causes the method of claim 8 to be implemented.

* * * * *